United States Patent [19]
Berg

[11] Patent Number: 4,602,823
[45] Date of Patent: Jul. 29, 1986

[54] PORTABLE COLLAPSIBLE WHEELS

[76] Inventor: Charles A. Berg, RFD 1, Box 165, Buckfield, Me. 04220

[21] Appl. No.: 622,668

[22] Filed: Jun. 20, 1984

Related U.S. Application Data

[62] Division of Ser. No. 293,843, Aug. 18, 1981, abandoned.

[51] Int. Cl.⁴ .......................... B60B 1/02; B60B 21/02
[52] U.S. Cl. ............................................ 301/32; 301/55
[58] Field of Search ..................... 301/5 R, 30, 31, 32, 301/55; 152/306–309

[56] References Cited

U.S. PATENT DOCUMENTS

| Re. 14,770 | 12/1919 | Bretscher | 301/32 |
|---|---|---|---|
| 466,598 | 1/1892 | Bunker | 301/55 |
| 556,121 | 3/1896 | Wolff | 301/60 |
| 964,632 | 7/1910 | De Ferranti | 301/60 |
| 1,009,423 | 11/1911 | Latimer | 301/32 |
| 3,088,775 | 5/1963 | Hawkes | 301/55 |

FOREIGN PATENT DOCUMENTS

| 594494 | 6/1959 | Italy | 301/58 |
|---|---|---|---|

*Primary Examiner*—David A. Scherbel
*Attorney, Agent, or Firm*—Daniel H. Kane, Jr.

[57] ABSTRACT

A portable collapsible wheel is provided with fabric-type material spoke elements extending between the hub and the rim for performing the spoke function. The fabric-type material bears the weight of the load supported by the wheel in suspension from the rim. The spoke elements are secured to the hub and the rim and means are provided for tensioning the spoke material. The fabric-type material spoke elements diverge from each other toward the hub for triangulation and stability. The spoke elements may be in the form of disks or shallow conical elements secured to the rim as by hooks, and may be collapsed and folded into a small space. For tensioning, telescoping hub elements are described by way of example. A variety of rim constructions are also provided including a collapsible rim or segmented rim of a plurality of articulated polygonal abutting rim segments flexibly joined in sequence. Segmented rim may be folded and compressed into a circular arch with peripheral tread which forms the wheel tread. The fabric-type material spoke elements may comprise foldable strips such as ropes lines, cords or cables extending between the hub and rim and compressing the rim segments under tension. A fully collapsible wheel is therefore provided. A compression type portable wheel with conical shell spoke elements is also described.

10 Claims, 17 Drawing Figures

PORTABLE COLLAPSIBLE WHEELS

This is a division of patent application Ser. No. 293,843, filed Aug. 18, 1981, now abandoned.

FIELD OF THE INVENTION

This relates to new and improved portable and collapsible wheels suitable for use in portable trailers, carts, and gear carriers, for small boat and canoe carriages, and for related applications where portable equipment is required. The portable and collapsible wheels may be adapted for bearing a range of loads from light duty to heavy duty use according to the materials and mode of construction selected.

BACKGROUND OF THE INVENTION

Since the advent of rubber tires and pneumatic tires, a multitude of collapsible tire rim wheels have been devised and proposed. The primary object of such collapsible wheels is to provide for collapse and removal of the rim in order to facilitate changing the tire. Typical examples of such prior art inventions are found in U.S. Pat. Nos. 1,009,423; 1,530,865; 1,163,257; and 4,056,285. Such devices do not provide wheels which are collapsible for the purposes of providing a lightweight portable wheel which may be reduced to a small package. Rather they are intended simply for ease in demounting the rim for changing the tire. Not all of the elements of the tire are fully collapsible or adapted for packing in a small space.

In U.S. Pat. No. 1,544,375, Cook describes an expansible rim which includes a fitting for expanding and contracting the rim for removal and replacement of tires. In U.S. Pat. No. 2,170,404 Greaker describes a wheel for artillery vehicles in which the rigid spokes may be dispaced or offset in one direction along the axle against a conical surface to relieve forces on the rim. The rim is then easily removed from the outer end of the spokes for in turn removing and replacing the tire. Thus, the spokes may be offset from a position substantially normal to the axis to a conical offset which permits removal of the tire.

In all the foregoing art, however, a truly portable tire is not contemplated. With the exception of the Greaker reference, only the rim is collapsible and that is for the purpose of changing the tire. In each of the foregoing references a heavy rim is contemplated and a separate tire fitted over the rim. Rigid spokes are required and are generally part of a heavy hub. In Greaker even though the spokes are displaceable along the axle they are nonetheless rigid and not truly collapsible for purposes of portability and packing in a small space.

OBJECTS OF THE INVENTION

It is therefore an object of the present invention to provide a new and improved low weight collapsible and portable wheel whose spoke, rim and tire elements are foldable or collapsible for storage and transport in a small space, and yet which is easily assembled, for a range of load bearing applications from light duty to heavy duty.

Another object of the invention is to provide portable and collapsible wheels in which a foldable fabric-type material is used to perform the spoke function for bearing loads under tension suspended from the rim of the tire. The invention also contemplates providing a segmented rim of articulated abutting segments which cooperates with the foldable fabric-type material spoke elements to form a circular arch wheel rim when assembled. By this expedient a strong rigid load bearing tire is provided after the elements of the invention have been assembled.

A further object of the invention is to provide a variety of couplings and fittings for coupling foldable fabric-type material spoke elements between a rim and a hub and for adjustably applying tension to the spoke elements.

Additionally the invention contemplates providing a compression spoke wheel for heavier duty applications which is also collapsible and portable.

SUMMARY OF THE INVENTION

In order to accomplish these results the present invention provides a portable collapsible wheel having a fabric-type material extending between the hub and the rim for performing the spoke function. That is, a fabric-type material bears the weight of the load supported by the wheel in suspension from the rim. The fabric-type material spoke arrangement is coupled or secured to the hub and to the rim and means are provided for tensioning the spoke material. In the preferred embodiment the fabric-type material spoke construction includes right hand and left hand spoke elements secured together adjacent to the rim at the periphery of the wheel. The spoke elements diverge from each other toward the hub at the center of the wheel. Thus, the right and left hand spoke elements are secured to the hub at spaced apart locations relative to each other to impart triangulation and stability to the wheel.

According to one embodiment of the portable and collapsible wheel invention the fabric-type material spoke elements are in the form of annular disks or cones having outer edges joined to each other at the periphery of the wheel and inner edges diverging from each other toward the center of the wheel. The annular disks or cones are formed with a line, cord, or cable around the joined outer edges for securing to the rim. Similarly, such lines, cords or cables are formed around the inner edges of the respective right and left and annular disks for securing the diverging inner edges to the hub at spaced apart positions. This coupling may be accomplished by for example providing hooks or loops around the inside of the rim and exposing portions of the line or cord around the joined outer edges of the fabric-disks for engaging the hooks.

A feature and advantage of the fabric-type material spoke construction and spoke elements of the present invention is that the spokes may be collapsed and folded into a small space for portability and collapsibility of the wheel. As used in the specification and claims, the phrase "fabric-type material" or "foldable" material is intended to include any natural or synthetic fiber materials, foldable sheet materials, metal fiber materials, leather, and plastic and resin sheet or fibrous materials, etc. Such fabric-type materials are characterized by being flexible and foldable back upon themselves for collapsing, folding and storage in a small space. Such fabric-type materials may also be stiffened under tension and exhibit the desired strength under tension for either light duty or heavy duty use performing the "spoke function" in portable and collapsible wheels of the present invention.

By the word "foldable" is meant that the fabric-type material is sufficiently flexible to fold back upon itself for packing, storage, and re-use, or for sliding back upon itself when in the form of a strip over a hook, ring, or hoop for forming successive spokes and for tensioning against itself as hereafter described.

The phrase "spoke function" is generally intended to mean the function of tension spokes in bearing weight under tension and suspension from a rim where the spokes extend between the rim and the hub at the center of the wheel. Compression spokes are of course also known and in one embodiment the present invention contemplates conical shell spokes of rigid material in compression.

According to one example for applying tension to the foldable spoke elements, a hub is provided with first and second hub elements extendable relative to each other. The right and left hand spoke elements are secured respectively to the first and second hub elements. The hub also includes means for extending or "telescoping" the hub elements and for securing the hub elements at different extended positions for tensioning the fabric-type material spoke elements.

In the case where annular disk or cone spoke elements are used, a number of variations are disclosed. Thus, the annular disk spoke elements may be joined at the outer edges to form a peripheral annular pocket with an opening. The rim is inserted through the opening for mounting in the pocket and the pocket is formed with an outer tread comprising the wheel tread around the periphery of the wheel.

For tensioning the fabric-type material spoke elements in this embodiment a rim coupling is provided for expanding and contracting the circumference of the rim and for securing the rim at different expanded or contracted dimensions therefore setting a desired tension on the fabric.

In order to provide a fully collapsible and portable wheel a collapsible rim is also provided in the form of a segmented rim of a plurality of articulated polygonal abutting rim segments flexibly joined in sequence. The abutting rim segments are flexibly joined at the radially outer edges around the periphery of the wheel but are separable at the radially inner edges. The segmented rim may therefore be folded and compressed into a circular arch or opened into a substantially linear sequence. The rim segments are formed with peripheral treads which form in combination a tire tread around the rim when the circular arch is assembled. Each rim segment is also formed with a coupling means for engaging and securing the fabric-type materials spoke elements.

The rim segments of the articulated and segmented rim may have a variety of cross sectional configurations generally forming a channel such as for example a "U" shaped or truncated "V" shaped channel viewed with the cross section taken in a radial direction of the wheel. In the preferred embodiment the rim segments are formed with an "H" cross sectional configuration with the cross section similarly taken in a radial direction of the wheel. A belt or strap may be positioned around the wheel in the channel between the radially outwardly directed legs of the "H" cross section rim segments for compressing the rim segments into the circular arch wheel rim. Such a compression belt or strap is of course also used with the truncated "V" or "U" shaped rim segments. Tire treads are formed along the periphery of the radially outwardly directed legs of the rim segments thereby forming a wheel tread when the rim segments are compressed and assembled into the circular arch of the wheel rim.

According to a major alternative embodiment the fabric-type material spoke elements comprise foldable strips such as ropes, lines, cords, or cables extending under tension between the hub and the rim. Couplings such as hooks or rings are provided around the inside of the rim for slideably receiving the foldable strip spokes. The fabric-type material strip spoke elements fold back on themselves through the hooks or loops to form successive spoke elements which may be slideably tensioned between the rim and the hub. The spoke strips are secured to the hub at alternative spaced apart locations to afford diverging left and right hand spoke elements for triangulation and stability at the wheel. The hub may be composed of first and second hub elements extendable relative to each other as hereafter described for tensioning the strip spoke elements. The strip spokes extend between the first and second hub elements folding back on themselves through the rim couplings.

Another feature and advantage of the fabric-type material spoke elements either in annular disk or strip configuration is that couplings may be sewn into the spoke elements themselves for securing the spoke. Thus, cords or lines may be sewn into the inner or outer edges of the spoke elements or, the spoke elements may be sewn into the hub itself.

Thus the invention contemplates providing both a collapsible segmented rim of articulated abutting rim segments and foldable spoke elements of fabric-type material in either disk or other sheet configuration or line or other strip configuration. Couplings secure the spoke elements to the rim and hub and tension is applied to the mounted spoke elements. A fully portable and collapsible wheel is therefore provided capable of bearing a variety of loads from light duty to heavy duty use according to the materials and dimensions used. The wheels of the present invention therefore lend themselves to application in portable trailers, carts and gear carriers, small boat and canoe carriages and similar recreational and business applications where the equipment must be transported between uses and weight and space requirements are of importance.

In the foregoing portable and collapsible wheels the wheel load is borne by fabric-type material under tension and suspension from the rim. However, the invention also contemplates a portable and collapsible wheel of the compression type in which first and second conical shell spokes are provided from a substantially rigid material. The converging outer peripheries of the conical shell spokes are fitted into an annular groove formed around the inside of the rim. The first and second conical shell spoke walls diverge toward the center of the wheel and engage first and second hub elements compressable relative to each other. These hub elements maintain the conical shell spokes under compression against the rim from inside the rim when the hub elements are compressed together. This may be accomplished by a threaded coupling or other compression fitting between the hub elements. In this embodiment, the segmented rim of articulated rim segments having "H" shaped cross sectional configuration is ideally suited. The converging outer edges of the conical shell spoke elements fit between the radially inwardly directed legs of the "H" and are compressed against the inside of the rim by the hub elements. A compression belt or strap is received around the outside of the rim between the radially outwardly directed legs of the "H" for "counter-compressing" the rim into a circular arch.

A feature and advantage of the conical shell spoke compression wheel is that it provides a portable collapsible wheel capable of heavier duty use and bearing heavier loads than the fabric-type material tension and suspension spoke wheels.

Other objects features and advantages of the present invention will become apparent in the following specifications and accompanying drawings.

BRIEF DESCRIPTION OF THE DRAWINGS

FIG. 6 is a diagrammatic cross section of a collapsible wheel with a rim of three interfitting hoops while

DESCRIPTION OF THE PREFERRED EXAMPLE EMBODIMENTS & BEST MODE OF THE INVENTION

Figure 1:
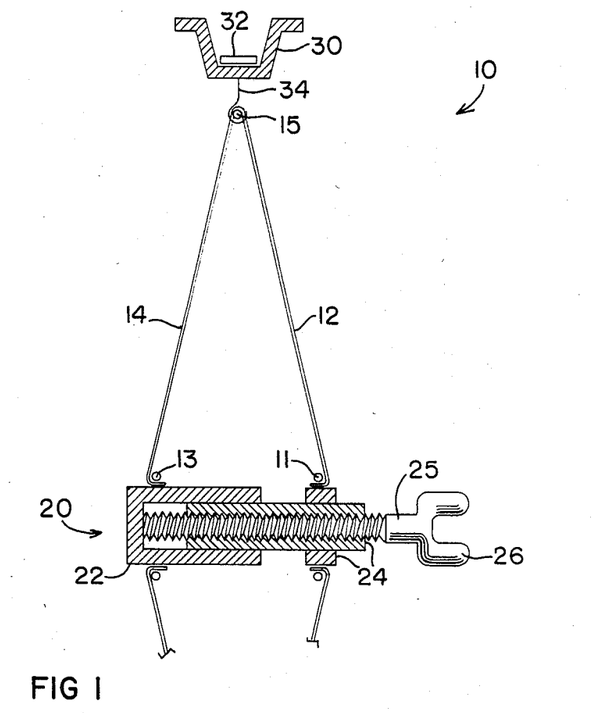
FIG. 1 is a partial cross sectional view from the front of a portable collapsible wheel according to the present invention having fabric-type material spoke elements of annular disk configuration.
Figure 1A:
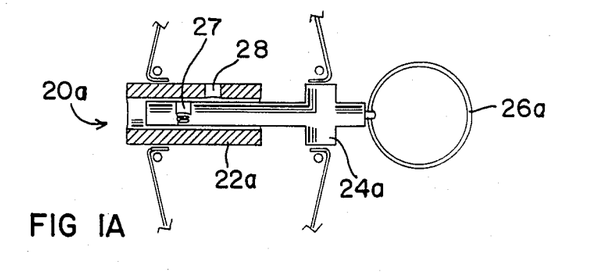
FIG. 1A is a partial cross sectional detail of an alternative hub for tensioning the spoke elements.
Figure 1B:
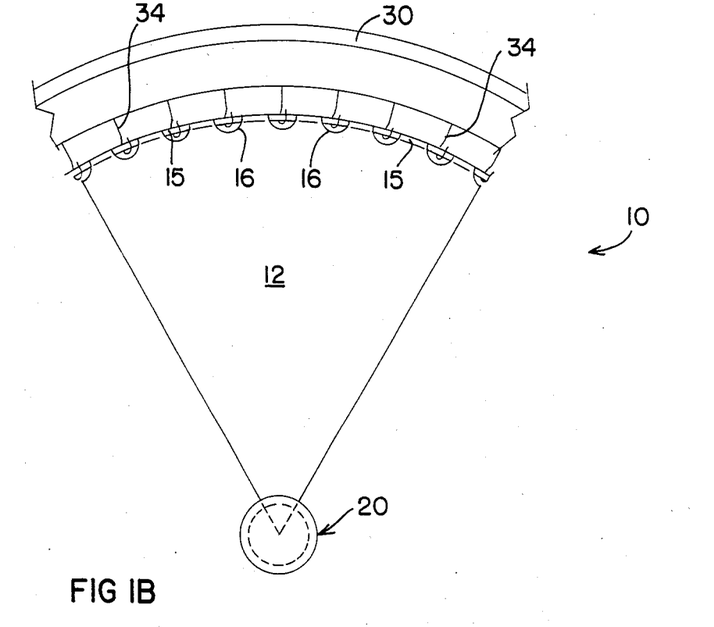
FIG. 1B is a fragmentary side view of a sector of the wheel showing an annular disk spoke element secured between the rim and hub.

In the embodiment of the present invention illustrated in FIGS. 1 and 1B there is shown a portable and collapsible wheel 10 generally comprising fabric-type material spoke elements 12 and 14 extending between the hub 20 and rim 30. The rim 30 is in the configuration of an annular channel such as a "U" shaped channel or truncated "V" shaped channel, opening in the direction radially away from the center of the wheel. The rim 30 may include a compression strap or belt 32 seated in the channel around the rim which reinforces the rim and holds the rim under compression. The rim also includes a plurality of hooks 34 distributed around the inside of the rim for engaging the fabric-type material spoke elements.

Spoke elements 12 and 14 are in the configuration of annular disks sewn together or otherwise joined at the outer edges. In this example the two spoke element disks are joined at the outer edges over a line, cord or cable 15 which may be sewn into the joined outer edges. The joined edges are formed with regular spaced openings 16 periodically exposing the line 15 to form loops in phase with hooks 16 depending from the rim so that the line 15 can engage the hooks and secure the spoke elements to the rim.

In the radial direction toward the center of the wheel the fabric disk spoke elements 12 and 14 diverge from each other to engage the hub at spaced apart locations. The annular disks or cones 12 and 14 may be joined to the hub by lines, cords or cables 11 and 13 which may be sewn into the inner edges of the respective disks and held in position at spaced apart locations on the hub by stops, ribs, or other projections from the hub. Alternatively, elements 11 and 13 may comprise clamps secured to the hub and frictionally holding the disks in place.

The hub 20 in fact comprises two hub elements 22 and 24 extendable and retractable relative to each other by means of threaded fitting 25. Thus, threaded fitting 25 threadedly engages hub element 24 and presses against hub element 22 to vary the relative extension of the hub elements under the tension of spoke element disks 12 and 14. Turning wing nut 26 permits varying the tension on the fabric-type material disks 12 and 14.

An alternative hub arrangement is shown in FIG. 1A where the hub 20a is similarly comprised of extendable hub elements 22a and 24a slideable relative to each other. Pull handle 26a permits sliding the hub elements relative to each other to an extended position which places tension on the annular disk spoke elements. A spring loaded pin 27 in hub element 24a engages pin hole or stop hole 28 formed in the other hub element 22a. The hub elements are released from the extended position by depressing the pin 27.

Figure 2:
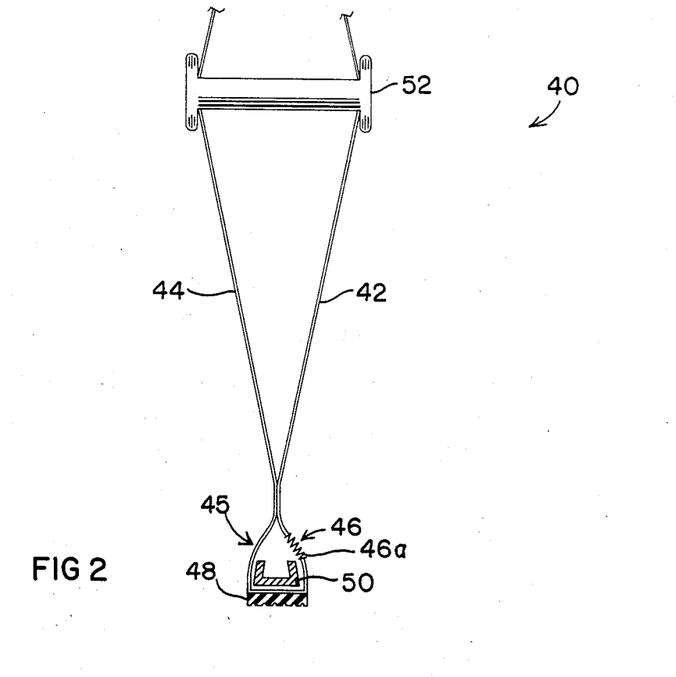
FIG. 2 is a partial front cross section of another portable collapsible wheel according to the invention where the annular disk or cone spoke elements form an outer peripheral pocket for mounting the rim.
Figure 2A:
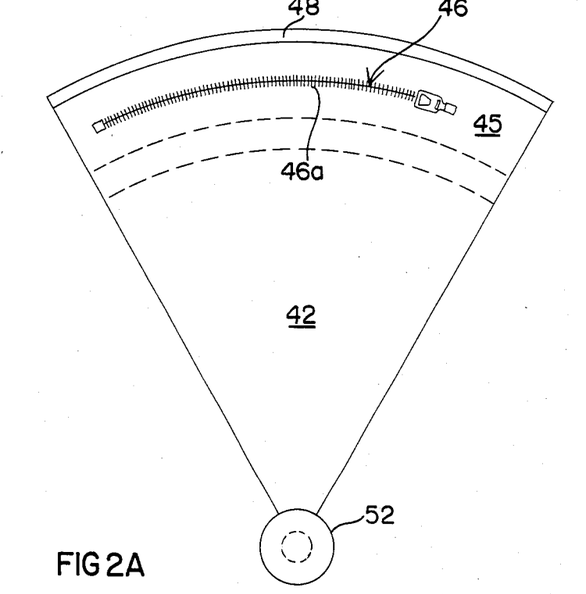
FIG. 2A is a partial side view of a sector of the wheel showing the outer peripheral pocket opening.

Another wheel 40 according to the present invention is illustrated in FIGS. 2 and 2A where the fabric-type material annular disk or cone spoke elements 42 and 44 are joined at their outer edges to form an annular pocket 45 with an opening 46 defined and controlled by the zipper 46a. In this example the rim 50 may be inserted through the opening 46 and mounted within the annular pocket 45 of the wheel. The outer periphery of the pocket 45 is formed with a tread 48 forming the tread for wheel 40. In the radial direction toward the center of wheel 40 the fabric spoke elements 42 and 44 diverge and are secured to the hub 52 at spaced apart locations as heretofore described. The annular disk spoke elements may be sewn directly into the hub or otherwise clamped or frictionally held at the outsides of the hub. Hub 52 may also be extendable and retractable for applying tension to the spoke elements.

Figure 2B:
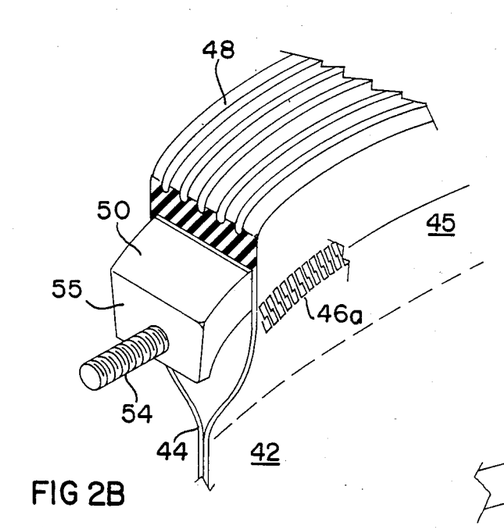
FIG. 2B is a fragmentary cross sectional view in perspective of the wheel rim showing the wheel rim coupling for expanding and contracting the circumference of the rim.
Figure 2C:
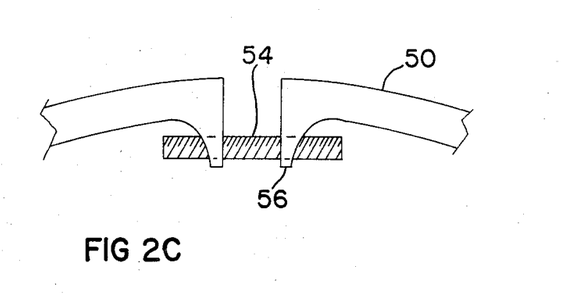
FIG. 2C is a fragmentary detail side view of the rim coupling or fitting for expanding and contracting the circumference of the rim to vary the tension on the spoke elements.

As shown by the detailed cross section in the perspective view of FIG. 2B and the detailed side view of FIG. 2C, the rim 50 is broken at one location in the circumference and provided with a threaded fitting 54 which engages the free ends of the rim 50 for adjusting the dimensions of the circumference of the rim and therefore the tension on the annular disk spoke elements 42 and 44. One variation is shown in FIGS. 2B and 2C. In these Figs. the threaded fitting 54 is threaded directly into the ends of the free end of the rim where a threaded end wall 55 has been provided. As shown in FIG. 2C the free ends of the rim are provided with depending projections 56 which are threaded to receive the fitting or threaded coupling 54. In this embodiment, the tension may be adjusted by varying the circumference of the rim.

Figure 3:
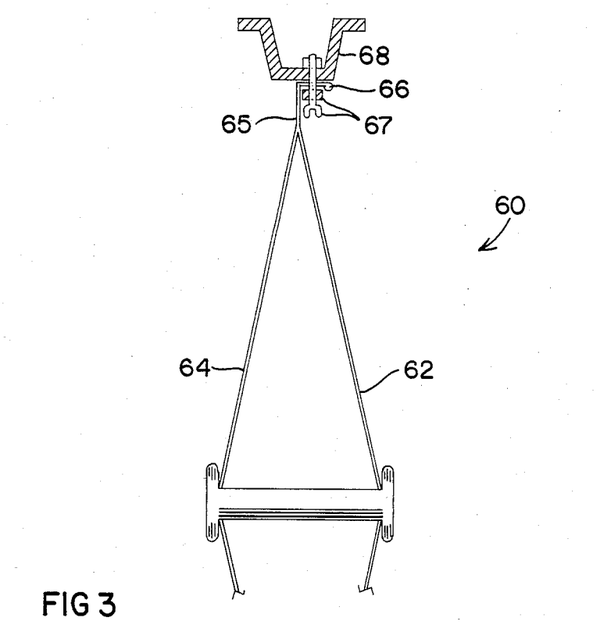
FIG. 3 is a partial front cross section of yet another wheel showing an alternative mode of securing the annular disk spoke elements to the rim.

Another arrangement for securing the annular disk spoke elements to the rim is shown in the wheel 60 of FIG. 3. In this example the annular cone spoke elements 62 and 64 are joined at the outer edges 65 and clamped to the inner surface of the rim 68 by means of the screw compression clamp 67 which passes through the rim 68 pressing the spoke elements against the rim. The joined ends 65 of the spoke elements may be sewn or otherwise joined around a line, rope or cable 66 which forms a stop border for the clamp 67. Thus, line 66 sewn into the joined ends 65 of the annular disk spoke elements prevent the spoke elements from slipping out of the grasp of clamp 67. Clamp 67 may be a continuous annular clamp around the inside of the rim or a plurality separate clamps distributed around the inside of the rim.

Figure 4:
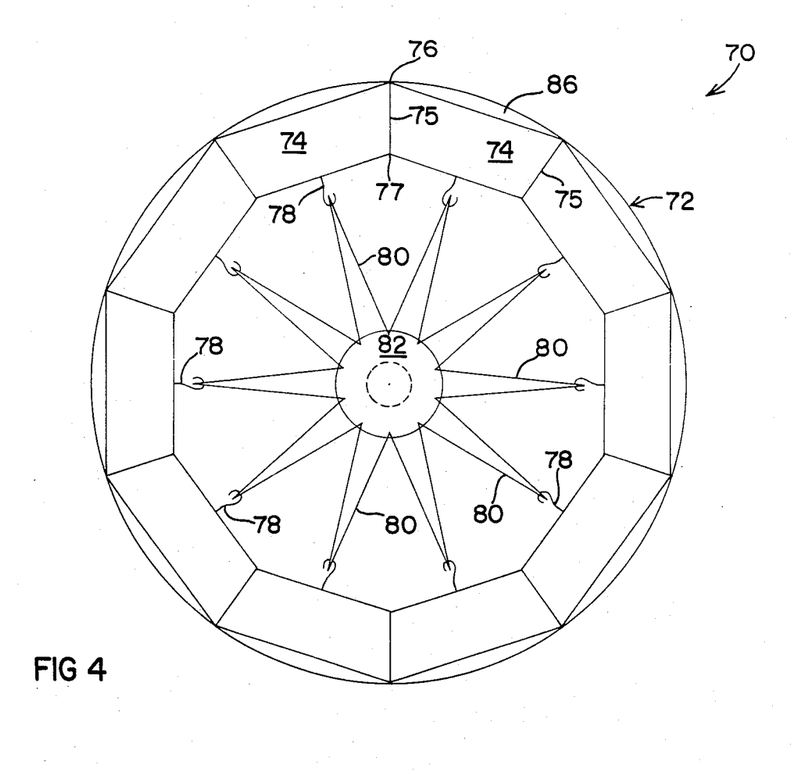
FIG. 4 is a side view of a portable collapsible wheel according to the invention having fabric-type material strip spoke elements coupled under tension between the hub and a segmented rim with the segmented rim assembled into a circular arch wheel rim.
Figure 4A:
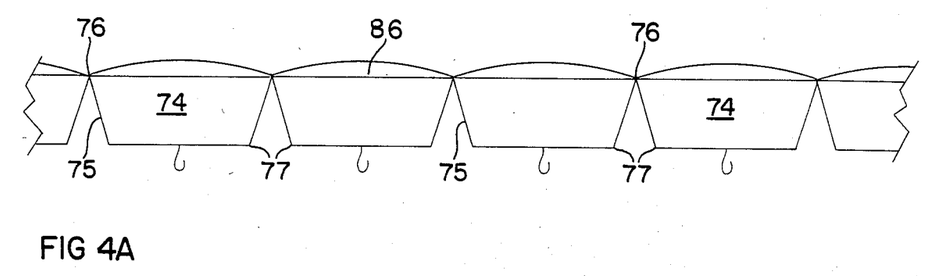
FIG. 4A is a detailed fragmentary side view of the segmented wheel rim with the articuted generally trapazoidal shaped rim segments in collapsed linear sequence.
Figure 4B:
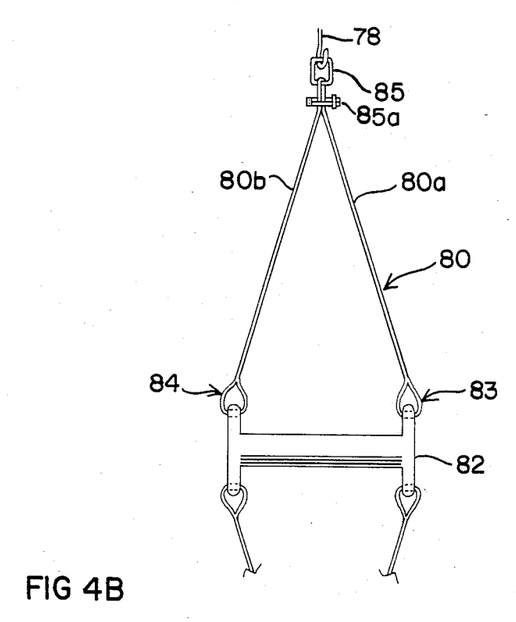
FIG. 4B is a detailed fragmentary front view of one arrangement for joining the foldable strip spoke elements between the hub and the rim.
Figure 5:
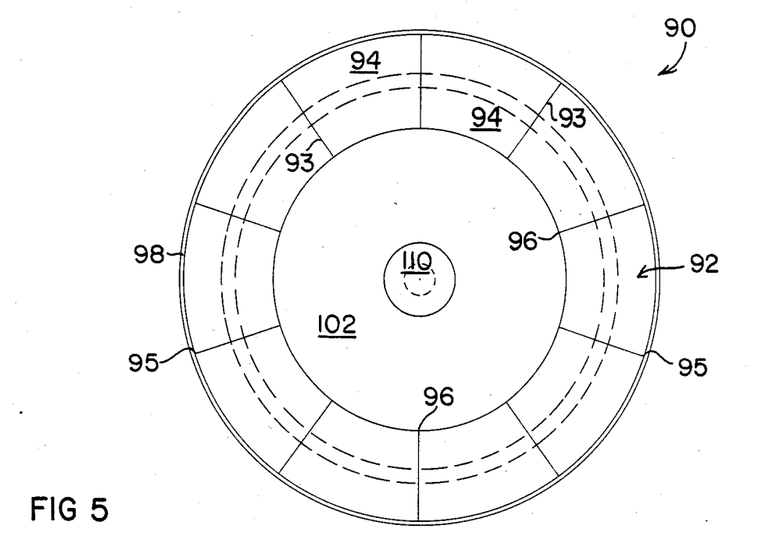
FIG. 5 is a side view of a compression wheel which is also portable and collapsible in accordance with the present invention.
Figures 5A, 5B, 5C:
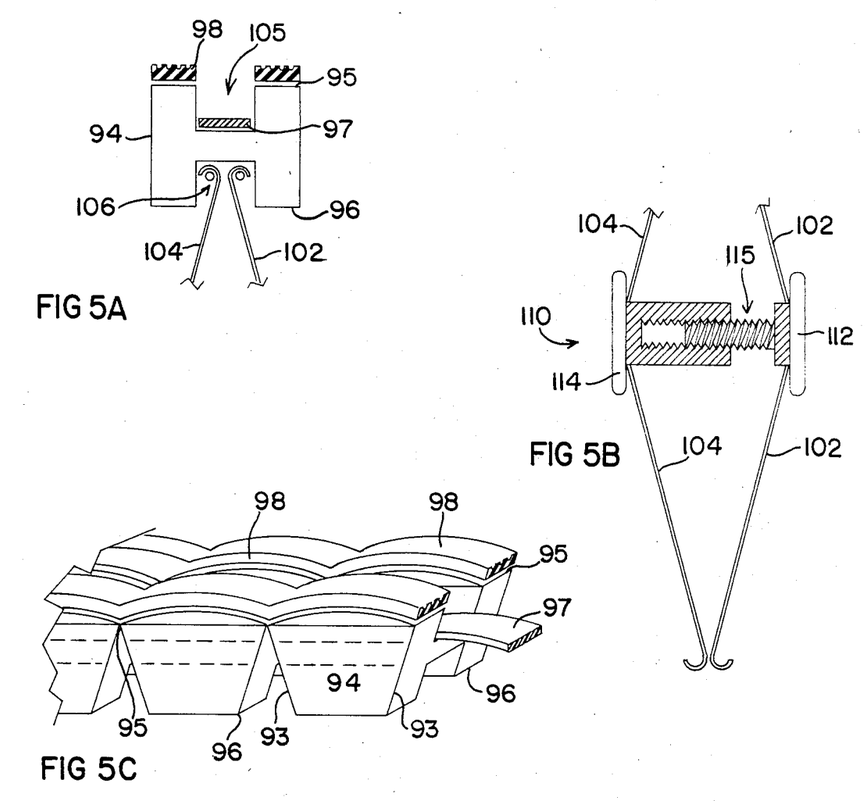
FIG. 5A is a detailed fragmentary front cross section of the wheel rim showing the "H" shaped cross sectional configuration with compression conical shell spoke elements, compression belt and outer treads.
FIG. 5B is a fragmentary cross sectional view from the front of the wheel showing the first and second compressible hub elements for placing the conical shell spoke elements under compression against the rim.
FIG. 5C is a detailed fragmentary perspective view of the collapsed wheel rim showing the positioning of the compression belt and tread elements at the "H" shaped configuration rim segments.

A different type of portable and collapsible wheel 70 according to the present invention is illustrated in FIGS. 4, 4A and 4B. In this example the rim 72 for the wheel is a segmented rim of articulated rim segments 74 of generally trapezoidal shape. More generally the rim segments may be viewed as of polygonal configuration with tapering sides 75 whose taper follows the radii or radial lines of the wheel. The abutting rim segments 74 are flexibly or hingedly joined at their respective outer edges 76 but separable at the inner edges 77 so that the segmented rim may be folded or compressed into a circular arch forming the rim 72, or opened and flattened into a linear sequence of flexibly joined segments 74 as shown in FIG. 4A. The segmented rim may be comprised of a light metal such as aluminum or of molded plastic of desired rigidity and strength according to the application. The preferred cross sectional configuration for the segments taken in the radial direction would be, for example, an "H" as shown in FIG. 5A hereafter described. The segments could also have the cross sectional configuration of a "U" or truncated "V" channel as shown in FIG. 3 however.

The wheel 70 of FIG. 4 differs also in having fabric-type material spoke elements 80 in strip configuration, that is in the configuration of a line, cord, rope, cable, belt, or strap or a plurality of such strips 80 extending between the hub 82 and the rim 72. As shown in more detail in FIG. 4B, the foldable strip spoke elements 80 are joined to the hub 82 at spaced apart left hand and right hand locations 83 and 84 after passing through a "D" ring 85 coupled to a hook 78 depending from one of the rim segments 74. Strips 80 are clamped by snubber buckles 85a. Thus each rim segment 74 is provided with at least one depending hook 78 for slideably engaging the strip spoke elements. In the example of FIG. 4B a plurality of strip spoke elements are provided each terminating at a right hand location 83 and a left hand location 84 of hub 82 and folding back upon itself through the "D" hook 85. Alternatively, a single longer strip element may be threaded through a plurality of spaced apart locations on the hub 82 and through a plurality of "D" hooks distributed around the inside of the segmented rim on the hooks 78 depending from the articulated rim segments 74.

In order to tension the strip spoke elements an expandable and retraceable hub or telescoping hub of the type heretofore described may be provided. Alternatively, tension may be applied directly to the strip spoke elements before joining to the hub. Thus, the left and right hand elements 80a and 80b, particularly where a single extended strip is used through multiple locations, may be tensioned against each other in the same manner as tightening shoe laces and clamped by buckles 18a.

The hinge joint or flexible joint between the outer edges 76 of the segments 74 may be in the form of flexible metal or plastic strips, or small hinges of other material may also be used as long as a durable pivotal, flexible joint is provided. The foldable strip spoke elements may be comprised of synthetic line such as Dacron or Nylon, straps of leather or synthetic material, foldable metal fiber cable, etc. The hub may similarly be formed of a light metal or molded plastic. The outer or peripheral surface of each segment 74 is provided with a tread element 86 which tread elements 86 in combination provide the tread for wheel 70 when the circular arch is assembled.

A portable and collapsible compression spoke wheel 90 according to the present invention is illustrated in FIGS. 5, 5A, 5B, and 5C. The wheel 90 is provided with a segmented rim 92 composed of a plurality of articulated abutting rim segments 94 of generally polygonal or trapezoidal shape viewed from the side and having tapering sides 93 which follow radial lines from the center of the wheel. As previously described these trapezoidal segments are flexibly joined as by flexible plastic or metal strips at the outer edges 95 but separable at the inner edges 96 so that the articulated segments may be folded or compressed into a circular arch forming the rim 92, or opened and collapsed into a linear sequence as shown in FIG. 5C.

A compression strap or belt 97 lies within the channel 105 formed by the radially outwardly directed legs of the the "H" shaped cross section segments as shown in FIG. 5A so that the circular arch may be held in compression by the belt 97. Furthermore, the outer peripheries of the outwardly directed legs are covered with tire treads 98 which from the wheel treads when the circular arch is assembled. The radially inwardly directed legs of the "H" shaped cross-section segments define an inner annular channel or groove 106 in which the outer converging edges of conical shell spoke elements 102 and 104 are seated. The annular conical shell spoke elements 102 and 104 are comprised of a stiff light metal and converge at the outer edges where they seat together in channel 106, but diverge in the radial direction of the center of the wheel to join hub 110 at right and left spaced apart locations on the separate hub elements 112 and 114. Hub elements 112 and 114 are extendable and retractable relative to each other by means of a threaded coupling or fitting 115 by which the hub elements may be forced together to place the conical shell spoke elements 102 and 104 in compression against each other and against the rim.

The entire compression spoke wheel 90 may be disassembled and collapsed including the rim, spoke elements, and hub for portable transport in a small light weight package occupying a relatively small space. Yet the compression spoke wheels once assembled can bear relatively heavy loads for a variety of portable transport applications.

The embodiments of the present invention illustrated in FIGS. 1 thru 3 have been described by way of example using fabric-type material annular disks for performing the spoke function. It should be noted that such fabric-type material annular disks may be in a flat disk configuration or in a shallow conical configuration as, for example shown in the cross sectional illustrations. A shallow conical taper or shape may be sewn in to the annular disk by forming the disk from shaped gores of fabric-type material. For example, triangular or trapezoidal gores of fabric-type material may be sewn, bonded, or otherwise joined together along the edges or seams to provide in combination the desired taper or shallow conical form. Alternatively, a triangular or trapezoidal gore or section may be cut out of a flat disk of fabric-type material. The cut edges of the disk are again sewn or bonded or otherwise joined together to provide a disk of shallow conical shape with the desired taper. Thus, as used herein and in the following claims the phrase "annular disk" or "disk" is intended to include disks of fabric-type material of flat configuration, shallow conical configuration, or otherwise formed with a taper by forming the disk from shaped gores of fabric type material or by removing a gore from a flat disk and rejoining the edges to form the desired taper.

Figure 6:
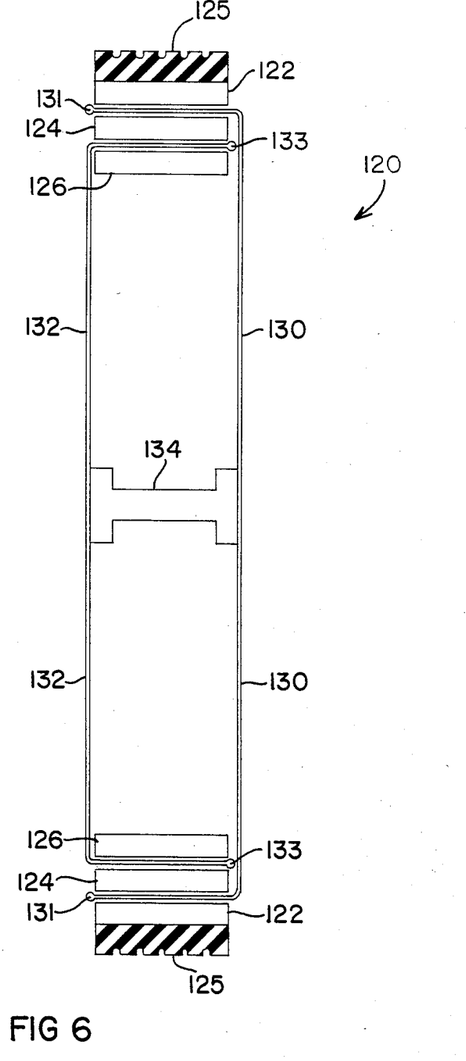

One further example embodiment of the present invention is illustrated in FIG. 6. In this example the rim of the portable collapsible wheel 20 is formed by three interfitting hoops 122, 124 and 126 having respectively decreasing diameters so that the hoops frictionally fit within one another. The largest hoop 122 of the wheel rim is formed with an outer tread 125 of a durable material which forms the wheel tread.

The wheel 120 is also formed with two spoke disks 130 and 132 made of fabric-type material for performing the spoke function. The fabric-type material disk spokes 130 and 132 are held under tension between the hoops of the rim and a central hub 134. The hub 134 may be sewn bonded or otherwise joined directly into the fabric disks 130 and 132.

As shown in the example of FIG. 6 the fabric disk spoke 130 is retained around its outer perimeter between the outer hoop 122 and hoop 124 of next largest diameter. Because of the tight fit between hoops 122 and 124 the spoke 130 is in turn tightly grasped and held under tension by the hoops. To prevent the spoke 130 from slipping out from between hoops 122 and 124, a cord or line 131 is sewn into the outer perimeter or edge of the disk 130.

Spoke 132 is in turn held tightly between the intermediate hoop 124 and the inner hoop 126. A line or cord 133 is similarly sewn in or otherwise joined to the perimeter or edge of fabric-type material disk 132 to prevent slippage of the disk from the frictional grasp between hoops 124 and 126.

Thus, the collapsible and portable wheel can be formed by a rim element comprised of a plurality of a tightly frictionally interfitting hoops which grasp the outer perimeters of the spoke function disks of fabric type material in a manner analogous to crochet hoops. The hub of the wheel may be sewn bonded or otherwise permanently joined into the fabric disks and thereby held in place under the tension of the disks grasped by the outer hoops.

While the invention has been described with respect to particular example embodiment, it is intended to cover all the variations and equivalents within the scope of the following claims.

Figure 6A:
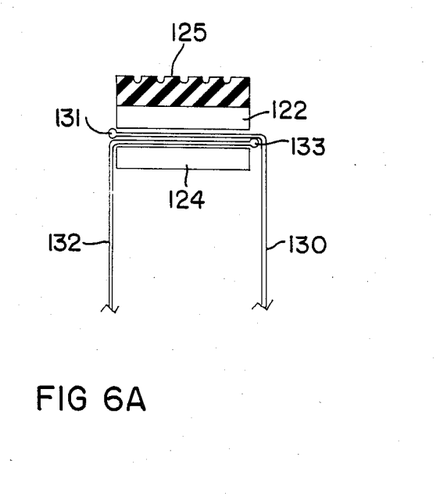
FIG. 6A is a cross section of a rim with two interfitting hoops.

In FIG. 6A an interfitting hoop rim collapsible wheel embodiment similar to that shown in FIG. 6 is illustrated with corresponding elements designated by the same reference numerals. In this example, however, only two interfitting hoops are used to frictionally engage the outer peripheries of the fabric-type material spoke elements and hold them under tension without slipping, In the examples of both FIGS. 6 and 6A the rim hoops themselves may be collapsed, and formed for example of a flat length folded on itself or of detachable or collapsible segments, coupled at the ends by hinges, threaded fittings, or other suitable couplings such as interfitting dovetail ends or pinned overlapping ends.

I claim:

1. A portable collapsible wheel comprising:
   hub means for positioning at the center of said wheel;
   rim means for positioning at the periphery of said wheel, said rim means comprising a segmented rim of a plurality of articulated substantially trapezoidal abutting rim segments flexibly joined in sequence at the radially outer edges and separable at the radially inner edges whereby said segmented rim may be folded and compressed into a circular arch or opened into a substantially linear sequence, said rim segments formed with peripheral tread means to form in combination a tire tread around the rim means when the circular arch is assembled;
   fabric-type material spoke means for extending between the hub means including means for securing said spoke means to the rim means at the periphery of the wheel and to the hub means at the center of the wheel;
   and tensioning means for tensioning said fabric-type material spoke means between the hub means and rim means.

2. The portable wheel of claim 1 wherein each of said segments is formed with coupling means on the inner side thereof for engaging said fabric-type material spoke means.

3. The portable wheel of claim 1 wherein said rim segments are formed with an "H" shaped cross-sectional configuration with the cross section taken in a radial direction of the wheel and further comprising belt or strap means for positioning around the wheel between the radially outwardly directed legs of said "H" cross-section rim segments and for compressing said rim segments into the circular arch wheel rim means.

4. The portable wheel of claim 3 wherein said "H" shaped cross-section rim segments are formed with tire tread means along the periphery of the radially outwardly directed legs of the "H" shaped cross section rim segments thereby forming a wheel tread when the rim segments are compressed and assembled into the circular arch wheel rim means.

5. The portable wheel of claim 1 wherein said fabric-type material spoke means comprises foldable strip means.

6. The portable wheel of claim 5 wherein said rim means is formed with coupling means around the inside thereof for slideably receiving said foldable strip spoke means whereby said foldable strip spoke means may be slideably tensioned between the rim means and hub means.

7. The portable wheel of claim 6 wherein said coupling means comprises loop means, said strip spoke means folding back on itself through said loop means to form successive spokes and for tensioning.

8. A portable collapsible wheel comprising:

hub means for positioning at the center of said wheel;

segmented rim means for positioning at the periphery of said wheel, said segmented rim means comprising a plurality of articulated polygonal abutting rim segments flexibly joined in sequence at the radially outer edges at the periphery of said wheel and separable at the radially inner edges whereby said segmented rim may be compressed into a circular arch wheel rim means or opened into a linear sequence, said rim segments formed with peripheral tread means forming in combination, a wheel tread when the circular arch wheel rim means is assembled;

flexible and foldable strip spoke means extending between the hub means and rim means;

said hub means formed with first coupling means for coupling said strip spoke means to the hub means;

each said rim segment formed with second coupling means for slideably receiving said flexible and foldable strip spoke means for tensioning said spoke means between the hub means and rim means, said strip spoke means slideably folding back on itself through said second coupling means to form successive spoke elements.

9. The portable wheel of claim 8 further comprising compression belt means, said rim segments formed with groove means for receiving said belt means around the outside thereof for compressing said rim segments into a circular arch.

10. The portable wheel of claim 9 wherein said hub means is formed with first and second hub elements, means for extending or "telescoping" said hub elements relative to each other for further tensioning the strip spoke means, and means for securing said hub elements at different extended positions.

* * * * *